United States Patent [19]

Colton

[11] 4,220,002
[45] Sep. 2, 1980

[54] JET ENGINE WITH NOISE ENERGY DISSIPATION

[76] Inventor: Roland J. Colton, 41 Vista Way, Port Washington, N.Y. 11050

[21] Appl. No.: 863,836

[22] Filed: Dec. 23, 1977

[51] Int. Cl.$^2$ .................. F02K 1/00; B63H 11/10; F01N 3/00
[52] U.S. Cl. .................. 60/271; 239/265.19; 181/213
[58] Field of Search .................. 60/271; 181/215, 213, 181/220; 239/265.11, 265.19, 265.13

[56] References Cited

U.S. PATENT DOCUMENTS

| 2,882,991 | 4/1959 | Killian | 181/213 |
|---|---|---|---|
| 2,959,917 | 11/1960 | McGehee | 181/213 |
| 2,984,972 | 5/1961 | Davidson | 239/265.15 |
| 3,041,218 | 6/1962 | Layton | 60/271 |
| 3,153,319 | 10/1964 | Young et al. | 181/215 |
| 3,568,792 | 3/1971 | Urquhart | 181/215 |
| 3,572,464 | 3/1971 | MacDonald | 181/215 |

FOREIGN PATENT DOCUMENTS

| 1086161 | 7/1960 | Fed. Rep. of Germany | 60/271 |
|---|---|---|---|
| 2441346 | 3/1975 | Fed. Rep. of Germany | 181/215 |
| 1195859 | 11/1959 | France | 181/215 |

*Primary Examiner*—Carlton R. Croyle
*Assistant Examiner*—Thomas I. Ross
*Attorney, Agent, or Firm*—Bierman & Bierman

[57] ABSTRACT

Means to damp the transmission of gas vibration aft of the tailpipe from the high velocity exhaust gas to the relatively slow moving airstream surrounding the said tailpipe of a jet engine wherein a metallic fringe, due to the low resonant characteristics of slack fine wire, acts as a vibration damper when externally affixed and surrounding the terminus of the said tailpipe, with an additional vibration impediment comprising a miniature airfoil surrounding the said terminus while functioning as an air-pressure reducer wherein a low air-pressure area is interposed between the said exhaust gas and the said airstream.

6 Claims, 3 Drawing Figures

JET ENGINE WITH NOISE ENERGY DISSIPATION

My invention pertains to internal combustion engines of the jet engine classification and embodying round, square or rectangular tailpipes. The objective of my invention is to provide means to reduce the noise caused by the products of combustion hereinafter referred to as exhaust gas.

Heretofore exhaust gas while in a state of vibration and moving at high velocity has been impinged upon the relatively slow moving external airstream surrounding the tailpipe while vibration is transmitted from the boundary layer of the said exhaust gas to the surrounding airstream adjacent to the said tailpipe, thus generating audible sound.

Persons versed in the arts to which my invention pertains, may be enabled to make and use this device by referring to the specification and drawings which in this particular case embody a square tailpipe with reference numerals which are applicable to round or rectangular tailpipes.

Referring to the drawings.

Figure 1:
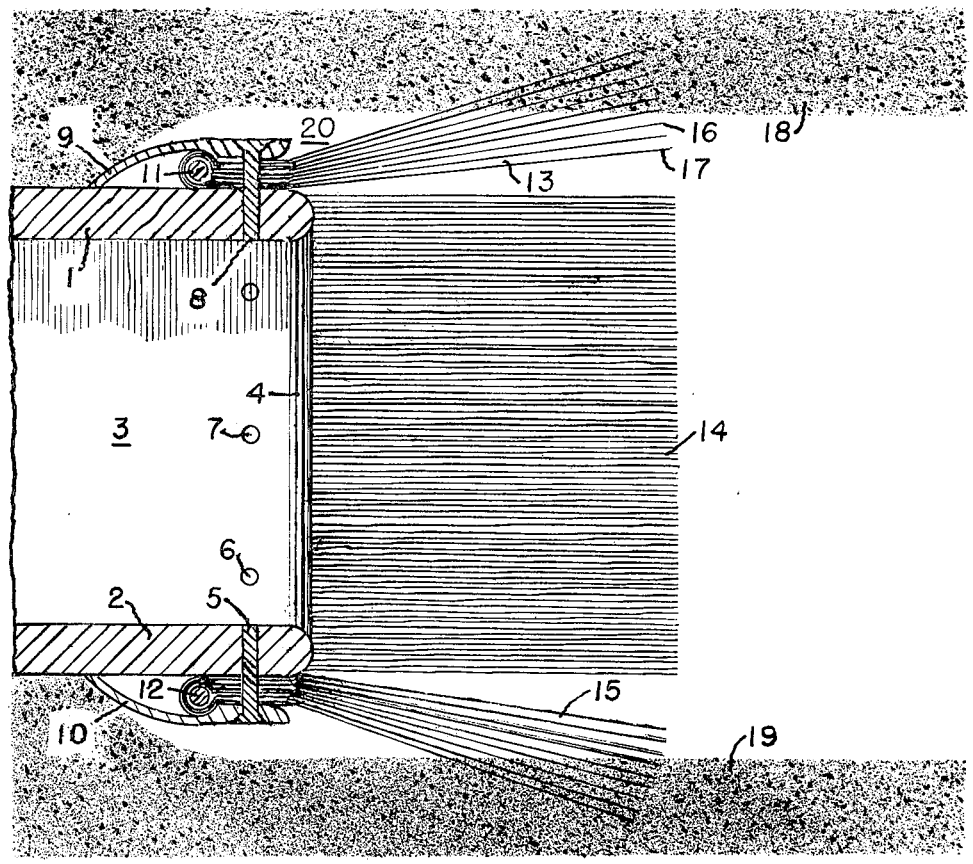
FIG. 1 is a sectional view of the terminus of a jet engine tailpipe provided with a metallic fringe and a miniature airfoil completely surrounding the said tailpipe.

Referring to FIG. 1, part of the upper side of a square tailpipe is indicated in section at 1, the lower side of the said tailpipe is indicated in section at 2, while the right side of said tailpipe is indicated in elevation at 3, with the terminus of the said tailpipe indicated at 4. Tapped screwholes are indicated at 5, 6, 7 and 8 wherein resides machine screws such as indicated and shown in section at 5 and 8.

In FIG. 1, elements 9 and 10 denote the upper and lower sections of an airfoil mounted adjacent the terminus of the tailpipe. As mentioned above, the airfoil surrounds the terminus end of the tailpipe, the front and rear elements needed to complete the airfoil having been omitted from FIG. 1 for the sake of clarity.

In FIG. 1, numeral 13 denotes a single wire mounted on a spacer, such as spacer 11. The wire 13 surrounds a portion of the periphery of the spacer and the ends of the wire, denoted by the numerals 16, 17, extend downstream of the tailpipe terminus and into the region between the flow of exhaust gases and the surrounding airstream. The wires dampen the vibration which would otherwise result from the direct contact of the high velocity exhaust gases with the slower moving airstream. In the drawing, numeral 14 is used to denote the wires on the rear of the square tailpipe and 15 is used to denote the wires on the bottom of the tailpipe. For clarity, FIG. 1 does not illustrate the wires that would be mounted on the front, or cut away, portion of the tailpipe.

As illustrated, the airfoil elements are secured in place by a plurality of screws mounted about the periphery of the tailpipe. The screws, here shown in two locations and denoted by the numerals 5 and 8, also serve, with the airfoil elements, as anchor points to secure or clamp the wires about the periphery of the tailpipe.

The airfoil elements divert the airstream indicated at 18 and 19 thus causing a low air-pressure area as indicated at 20. The low air pressure condition induced downstream of the tailpipe terminus serves to delay the time of contact between the exhaust gas and the external airstream.

As the exhaust gas is of a high temperature, heat-resistant wire such as copper, Kenmetal or stellite is preferred, although any wire found suitable may be used. As shown in FIG. 1, with reference to wire 13, one leg, denoted by the numeral 16, is further from the exhaust gases than the other leg denoted by the numeral 17. For best results, provision should be made for reversal of the metallic fringe when the inside wire 17 shows signs of burnout. This reversal may be accomplished by simply removing the element 9 shown in FIG. 1, and reversing the fringe so that the inner and outer wires are reversed and replacing the element 9 in the position shown.

Figures 2, 3:
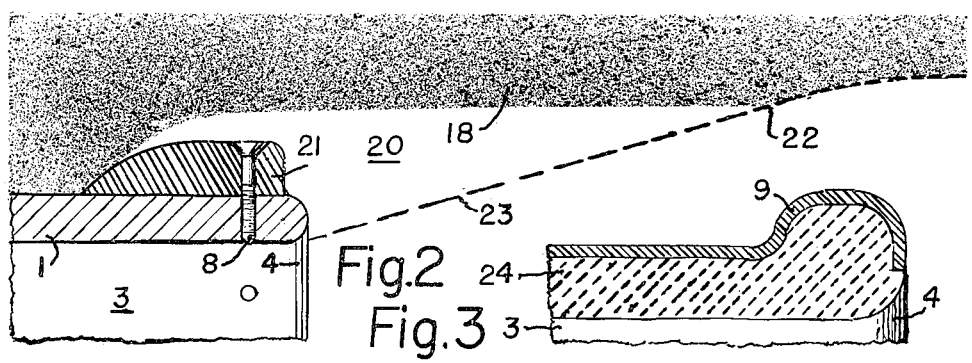
FIG. 2 is a sectional view of part of the upper side of a jet engine tailpipe minus the metallic fringe and embodying a miniature airfoil attached to the said tailpipe.
FIG. 3 shows a sectional view of a fragment of the upper side of the terminus of a jet engine tailpipe wherein an external metal jacket encloses a tailpipe-lining of refractory material while the said jacket is bent to form a miniature airfoil adjacent to and surrounding the said tailpipe.

Referring to FIG. 2, a solid miniature airfoil is indicated at 21 and secured to the tailpipe 1 by flathead machine screws such as indicated at 8. Thus causing the airstream 18 to be diverted while creating a low air-pressure area as indicated at 20. The broken line extending from the terminus of the tailpipe indicates the upper boundary of the expanding exhaust gas enamating from the said tailpipe, with said gas contacting the external airstream at the position indicated at 22, with the numeral 23 indicating the position of the said contact if the miniature airfoil is removed.

FIG. 3 shows a miniature airfoil indicated at 9 and integral with a square, round or rectangular metal jacket surrounding a refractory tailpipe-lining indicated at 24.

Here it may be seen that my invention function as a means to compel the boundary layer of the gas to contact the external airstream after passing through a rarified atmosphere, with further means to interpose a fine wire brushlike element within the said rarified atmosphere adjacent to, and aft of the terminus of the jet engine tailpipe wherein the low resonance characteristics of slack wire embodied in the said brushlike element comprises a vibration damper. This device may employ airfoil and fringe or one may be omitted.

Without departing from the essence of my invention, the method of clamping the wires to the tailpipe may be independent of the miniature airfoil, while the said wires may be of any length found suitable and of any wire gauge size, or any well known means of attaching the wires in the position shown is within the scope of my invention.

Having described my invention, I claim:

1. Apparatus for reducing noise in jet engines having a tailpipe comprising in combination with said tailpipe a plurality of metallic wires mounted on said tailpipe, said wires being located about the periphery of said tailpipe and extending downstream of the terminus of said tailpipe in the direction of the flow of exhaust gas therefrom, and airfoil means mounted adjacent said tailpipe terminus for deflecting the airstream in the region of said tailpipe terminus and creating a low pressure region in the vicinity of the exhaust gases, said wires serving to dampen the vibrations of said exhaust gases in said low pressure region.

2. The apparatus according to claim 1 further comprising a spacer mounted adjacent the terminus of said tailpipe, each of said wires being mounted on said spacer such that the ends of each wire extend downstream of said tailpipe terminus.

3. The apparatus according to claim 2 wherein said airfoil surrounds the surface of said tailpipe and is spaced therefrom, said spacer being mounted between said surface and said airfoil.

4. The apparatus according to claim 3 further comprising clamping means located between said spacer and said tailpipe terminus for clamping the wires against the surface of the tailpipe.

5. The apparatus according to claim 2 wherein said wire is bent about said spacer, one free end being located closer to the flow of exhaust gases than the other of said ends.

6. Apparatus for reducing noise in jet engines having a tailpipe comprising in combination an airfoil mounted about the periphery of said tailpipe adjacent the terminus of said tailpipe, a hollow region between said airfoil and said tailpipe, a spacer mounted in said hollow region, a plurality of wires bent about said spacer, the ends of each of said wires extending downstream of the terminus of said tailpipe, and means for clamping said airfoil and said wires to the tailpipe.

* * * * *